United States Patent Office 2,969,806
Patented Jan. 31, 1961

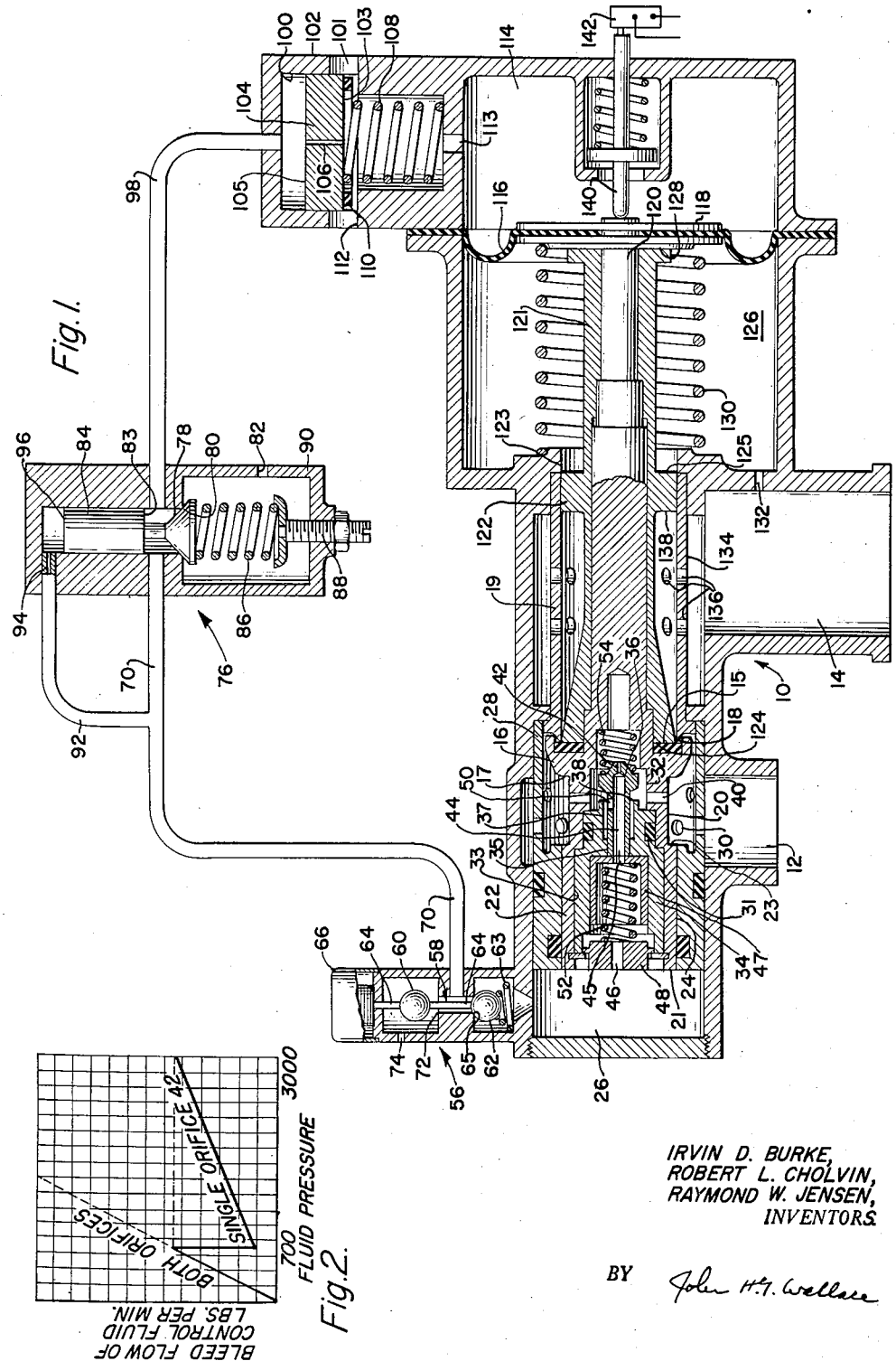

2,969,806

PRESSURE REGULATOR AND SHUTOFF VALVE

Raymond W. Jensen, Irvin D. Burke, and Robert L. Cholvin, Phoenix, Ariz., assignors to The Garrett Corporation, Los Angeles, Calif., a corporation of California Filed Apr. 5, 1957, Ser. No. 651,066

9 Claims. (Cl. 137—495)

This invention relates to a pressure regulator and shutoff valve, and more particularly to such a valve adapted to deliver fluid at a regulated pressure while receiving fluid over a wide range of pressure.

A pressure regulating and shutoff valve, which controls the flow of fluid from a tank at high pressure must operate properly when the tank is almost empty and the fluid pressure therein is correspondingly reduced.

A pressure regulating and shutoff valve may be required to control itself by means of fluid obtained from the tank, wherein fluid is initially maintained at very high pressure, said pressure subsequently dropping due to withdrawal of the fluid from the tank.

It is recognized that such a self-powered pressure regulating and shutoff valve, controlled by fluid bled from the main source, may be required to function economically with respect to the usage of such fluid for controlling the modulating and shutoff actions.

Pressure regulating and shutoff valves, used to control high pressure fluids in aircraft, are required to be very compact and reliable and, in addition, economical in operation.

Accordingly, it is an object of the present invention to provide a high pressure regulating and shutoff valve which is capable of accurately modulating or shutting off flow therethrough.

Another object of the invention is to provide a pressure regulating and shutoff valve which is particularly adapted for use in controlling flow from a source of fluid wherein the pressure varies over a wide range.

Another object of the invention is to provide a pressure regulating and shutoff valve having a novel combination of elements for balancing and actuating a fluid controlling valve member by means of high pressure fluid communicating therewith.

A further object of the invention is to provide a pressure regulating and shutoff valve having novel two-stage orifice means, which provides for economical usage of control fluid from a source in which the fluid pressure varies greatly.

A further object of the invention is to provide a pressure regulating and shutoff valve for use in controlling high pressure fluids and which is capable of very rapid shut-off.

Other objects and advantages of the invention may be apparent from the following specification, appended claims and accompanying drawing, in which:

Figure 1 of the drawing is a schematic axial sectional view of a pressure regulating and shutoff valve constructed in accordance with the present invention; and Figure 2 is a graphic illustration relating the pressure of fluid entering the valve of the present invention to bleed flow of such fluid required to control the valve.

The pressure regulating and shutoff valve of the present invention is provided with a housing 10, having a high-pressure fluid inlet 12 and a pressure fluid outlet 14. A main valve member 16 is disposed to control or shut off the flow from the inlet 12 to the outlet 14. The valve member 16 may be and is shown as a poppet valve, such valves being well adapted to control high-pressure fluid, as for example, fluid at pressures in the region of 3,000 p.s.i. The valve member 16 is provided with a washer 15 engageable with an annular seat 18, which separates the inlet 12 from the outlet 14. The seat 18 is disposed at one end of a baffle cylinder 19, which will be hereinafter described in detail. The valve member 16 is provided with a hollow shaft 20 of smaller diameter than the valve member 16.

Provided on the shaft 20 in spaced relation to the valve member 16 is a piston 22, which is closely fitted in a bore 24, communicating with the inlet 12 at one end and with a chamber 26 at its opposite end. Positioned in the inlet 12 and surrounding the shaft 20 is a cylindrical baffle 28 having perforations 30 therein.

This baffle acts to distribute the flow of high-pressure fluid from the inlet 12 evenly around the valve member 16, when it is open, and permits high-pressure fluid to flow past the seat 18 and into the outlet 14. Thus, the cylindrical baffle 28, by means of the perforations 30, permits flow from the inlet 12 to the valve member 16 without creating lateral thrust on the shaft 20, which might otherwise tend to cause eccentric engagement of the valve member 16 with the seat 18.

The shaft 20 is a hollow cylindrical member having a bore 32 communicating with a valve sleeve 34 which is fixed in an enlarged bore 33 of the piston 22. The valve sleeve 34 is sealed in said bore 33 by means of an O-ring seal element 31. Reciprocally mounted in a bore 35 of this valve sleeve 34 is a poppet valve 36, which is engageable with a seat 38 at one end of the sleeve 34. The seat 38 is located at the terminus of an enlarged bore 37 in the sleeve 34. The shaft 20 is provided with an opening 40, which receives pressure fluid from the inlet 12 and communicates with the bore 32 and the poppet valve 36.

This poppet valve 36 is provided with a bleed orifice 42, which communicates with the chamber 26 through a bore 44, in the poppet valve 36, an opening 45 in a spring supporting cup 47, and through an opening 46 in an end member 48 which is secured in the bore 33 of the piston 22. The poppet valve 36 is also provided with another orifice 50, which is inwardly of the seat 38 and which also intercommunicates with the enlarged bore 37 and the bore 44. The orifice 42 is effective to permit flow through the poppet 36 at all times, while the orifice 50 permits fluid to flow therethrough only when the poppet 36 is open relative to the seat 38.

A spring 52 is disposed in the cup 47, which engages one end of the poppet 36 and tends to force it off the seat 38, thus tending to maintain the poppet 36 open with respect to the seat 38. A spring 54, having lesser force than that of the spring 52, engages the poppet 36 and opposes the spring 52, thereby tending to maintain the poppet 36 in engagement with the cup 47.

The poppet 36 acts as a two-stage orifice means and permits flow through the orifices 42 and 50 when fluid pressure in the inlet 12 is below a predetermined value. When pressure in the inlet 12 is above said predetermined value, it forces the poppet 36 against compression of the spring 52 to close on the seat 38, thereby shutting off flow through the orifice 50 and permitting control pressure fluid to bleed through the orifice 42 only. Operation of this two-stage orifice mechanism will be hereinafter described in detail.

Communicating with the chamber 26 is a solenoid operated control valve 56. This solenoid control valve is provided with a valve member 58 comprising a pair of spaced ball valve elements 60 and 62, which are interconnected by a reduced diameter stem 64. The stem 64 also extends into a conventional solenoid winding 66. A spring 63, engaging the ball valve element 62, tends to maintain it closed against a seat 65. The solenoid 66 may be energized electrically as desired, for moving the ball valve element 62 against the force of the spring 63 and from the seat 65, thereby opening a passage from the chamber 26 to a conduit 70. At the same time, the ball valve element 60 is forced into engagement with a seat 72 which communicates with an atmospheric vent 74, as will be hereinafter described in detail.

It will be understood that the solenoid valve 56 is a conventional valve wherein the armature, in connection with the stem 64, is loaded by the spring 63 in one direction and movable in the opposite direction by electromagnetic force. When the solenoid 66 is deenergized, the ball valve elements 60 and 62 are maintained in the position shown, by the force of the spring 63 in engagement with the ball valve element 62.

The conduit 70 extends to a bleed-off control pressure regulator 76 and communicates with a pressure regulating poppet valve element 78 therein. This valve element 78 is engageable with a seat 80 communicating with atmosphere through a vent 82. The conduit 70 also communicates with an end 83 of a piston 84, which is connected to the poppet 78 and is mounted in a cylinder bore 79. The end 83 of the piston 84 is subjected to fluid pressure tending to move it in a direction to close the poppet 78 on the seat 80. The poppet 78 is subjected to fluid pressure tending to force it away from its seat 80. Fluid pressure, acting on the end 83 of the piston 84, is substantially balanced by that acting oppositely on the poppet 78. A spring 86 engages the valve element 78 and tends to hold it on the seat 80. An adjusting screw 88 is threaded in a housing 90 of the regulator 76 and serves as an adjustment for the spring 86 and consequently the control pressure established by the regulator 76.

Communicating with the conduit 70 is a branch conduit 92, which delivers pressure fluid to a restricted orifice 94 communicating with an end 96, of the piston 84, which is opposite to the end 83, as hereinbefore described. Fluid pressure forces, acting on the end 83 of piston 84 and poppet 78, are balanced, while fluid pressure acting on the end 96 of the piston 84, opposes the force of the spring 86 and ambient pressure communicating with the poppet 78 via the opening 82. Fluid flow through the orifice 94 permits a gradual change of fluid pressure at the end 96 of the piston 84, thereby permitting modulation of the valve 78 without hunting.

It will be understood that a certain amount of clearance between the piston 84 and the cylinder bore 79 may be utilized in place of the orifice 94 if desired, in order to accomplished the functions hereinbefore described.

As pressure in the conduits 70 and 92 tends to decrease, corresponding to a reduction in supply pressure, the pressure acting on the valve member 78 and piston 84, tends to change and move the valve member 78 relative to the seat 80.

The action of the valve member 78 relative to forces of the spring 86 and ambient pressure, causes pressure tending to exceed a predetermined amount to be bled off through the vent 82, thereby maintaining a desired reference pressure in the conduit 70 and in the output conduit 98. The conduit 98 communicates with a bore 100 of a cylinder 102, in which a piston valve 104 is reciprocally mounted.

The piston valve 104 is provided with an orifice 106, which permits restricted fluid flow therethrough. This orifice has somewhat smaller effective capacity than the orifice 42, so that fluid admitted to the conduits 70 and 98 from the orifice 42 will build up pressure on the upper end 105 of the piston valve and move the latter closed. A spring 108 engages the piston valve 104 and tends to force it axially of the bore 100 toward the conduit 98 in opposition to fluid pressure therein. One end of the piston valve 104 is provided with an annular gasket 110, which seats on a surface 112 of the housing 10, whereby fluid pressure acting on the piston valve 104 against the force of the spring 108, maintains sealing pressure against the gasket 110. The orifice 106 in the piston valve 104 communicates with a passage 113 leading to a chamber 114. A gasket engaging end 103 of the piston valve 104 has lesser area exposed to control fluid pressure than does an opposite end 105 of the piston valve, whereby a fluid pressure differential may act to compress the spring 108 and cause sealing engagement of the gasket 110 with the surface 112.

A diaphragm 116 serves as an actuator for the main valve 16. The diaphragm 116, at one side 118 thereof, communicates with the chamber 114, and this diaphragm 116 is connected to a shaft 120 which is fixed to and extends from the valve member 16. Mounted on the shaft 120 is a hollow cylindrical sleeve 121, which is provided with a guide 122 movably mounted in a bore 123 of the housing 10. One end 124 of the sleeve 121 engages the washer 15 inwardly of the seat 18 and thereby tends to hold the washer in place.

A chamber 126 of the housing 10 communicates with an end 125 of the guide 122 and a side 128 of the diaphragm 116, which side 128 is opposite to the side 118 of the diaphragm 116. A spring 130 engages the side 128 of the diaphragm 116 and tends to force the diaphragm toward the chamber 114, and also tends to force the valve member 16 toward the seat 18. The chamber 126 communicates with the outlet 14 through an opening 132. Disposed in the outlet 14 and surrounding the sleeve 121 is the baffle cylinder 19, having perforations 136, which permit the flow of fluid from the seat 18 therethrough and outwardly through the outlet 14. The cylinder 19 provides for even outflow of fluid around the sleeve 121, in order to prevent lateral thrust from being imposed thereon by the flow of pressure fluid into the outlet 14. The guide 122 is provided with an end 138, which is opposed to the valve member 16 and communicates with fluid pressure in the outlet 14, thereby tending to balance the force of fluid pressure in the outlet 14, which acts upon the downstream side of the valve member 16.

Engaging the side 118 of the diaphragm 116, is a plunger 140, which operates an electrical switch 142 for the purpose of remotely indicating an open or closed position of the valve member 16.

Operation of the present invention is substantially as follows:

The inlet 12 of the valve housing 10 may be connected to a high-pressure fluid supply, such as a tank or other pressure fluid supply means. When connected to a tank, the inlet 12 receives high-pressure fluid, which is conducted from the tank, through the valve seat 18, and into the outlet 14. When, for example, such a pressure fluid supply tank is full, fluid pressure may be in the region of 3,000 p.s.i., and when the tank is nearly empty, fluid pressure received in the inlet 12 may be very low. As shown in Fig. 2 of the drawing, fluid bleed-flow through orifices 42 and 50 is graphically illustrated relative to fluid pressure in the inlet 12 of the valve housing 10.

As hereinbefore described, the poppet valve 36 is maintained closed against its seat 38 by high-pressure fluid in the inlet 12. According to Fig. 2 of the drawings, for example, this condition prevails until pressure in the supply tank (not shown) is reduced to about 700 p.s.i., whereupon the spring 52 forces the poppet valve 36 off the seat 38 and exposes the orifice 50, which then permits sufficient flow of fluid, from the inlet 12, for the purpose of controlling the valve. It will be seen that when both orifices 42 and 50 are in operation and receiving fluid at approximately 700 p.s.i., the bleed-flow in pounds per minute increases sharply to approximately the amount which the single orifice 42 conducts when fluid pressure is in the region of 3,000 p.s.i. in the inlet 12. The two-stage orifice arrangement, including the orifices 42 and 50, permits sufficient control fluid flow at high and low pressures; however, the arrangement prevents excessive control fluid flow at high pressures, which might occur if a single fixed orifice were utilized to accommodate a pressure range from zero to 3,000 p.s.i. Such a single, fixed orifice would necessarily have to be large enough to accommodate sufficient control pressure fluid flow at low pressures. If an orifice of the combined flow capacities of both the orifices 42 and 50 were used at high pressures, the control pressure fluid bleed-flow would be excessive, according to the graphic illustration in Fig. 2.

The solenoid valve 56 is normally closed and tends to maintain the ball valve 62 on the seat 65. When the ball valve 62 is on the seat 65, pressure fluid passes from the inlet 12 through the orifice 42, or both orifices 42 and 50, into the chamber 26, whereby fluid pressure therein becomes equal to that in the inlet 12. During a normally closed condition of the solenoid valve, the spring 130 tends to maintain the valve 16 firmly engaged on the seat 18. Fluid pressure in chamber 26 also acts on end 21 of the piston 22, creating a pressure differential which assists the spring 130 to maintain the valve 16 closed upon its seat.

When the solenoid valve 56 is energized, the ball valve elements 60 and 62 are moved to positions wherein the ball 60 is engaged with the seat 72 and the ball 62 is removed from the seat 65. Fluid then flows from the chamber 26 through the seat 65 and into the conduit 70, communicating with the control pressure regulator 76. The pressure regulator 76 operates, as hereinbefore described, to vent excessive pressure from the conduit 70 downstream of the orifices 42 and 50, thereby maintaining a regulated control pressure in the conduits 70 and 98. Regulated control pressure acts on the piston 104, forcing it tightly against the gasket 110, thereby maintaining it in sealed relation with the face 112 of the housing 10, as hereinbefore described. Pressure fluid flows through the orifice 106 into the chamber 114 and acts upon the side 118 of the diaphragm 116, tending to oppose fluid pressure in the chamber 126 and to force the diaphragm 116 toward the chamber 126, in opposition to force of the spring 130. Initially, regulated control pressure in the chamber 114 overcomes the combined forces of the spring 130 and a lower fluid pressure acting in the chamber 126, and thus tends to move the valve 16 away from the seat 18. By the time regulated control pressure is established in the chamber 114, pressure in the chamber 26, at the end 21 of the piston 22, is equal to regulated control pressure. Fluid pressure acts oppositely on respective surfaces 17 and 23 of the valve 16 and piston 22, while regulated control pressure, acting on the end 21 of the piston 22, tends to hold the valve member 16 on its seat 18. The diaphragm 116, being of considerably larger diameter than the piston 22, is capable of overcoming the combined forces of the spring 130, fluid pressure in the chamber 126, and the fluid pressure differential acting on the piston 22 and valve 16.

As soon as the valve 16 is opened by a fluid pressure differential across the diaphragm 116, fluid flows from the inlet 12 into the outlet 14, thereby increasing the fluid pressure therein. Pressure of the fluid in the outlet 14 communicates with the chamber 126 through the opening 132 and is thereby permitted to act upon the side 128 of the diaphragm 116 and the end 125 of the guide 122. If fluid pressure in the outlet 14 increases beyond a predetermined value, it, combined with force of the spring 130, creates a force differential across the diaphragm 116, tending to move it toward the chamber 114 and to move the valve 16 toward the seat 18, thereby automatically reducing fluid flow through the seat 18, and consequently reducing pressure in the outlet 14.

If fluid pressure in the outlet 14 is reduced, below a predetermined value, regulated control pressure in the chamber 114 tends to overcome the force of the spring 130 and pressure in the chamber 126, thereby moving the valve 16 toward an open position and permitting an increased flow therethrough, which increases pressure in the outlet 14. Thus, fluid pressure in the outlet 14 is referenced to regulated control pressure in the chamber 114 by means of the diaphragm 118.

It will be here noted that the diaphragm 116 may be replaced by an equivalent piston, in the event the valve is utilized to control high-temperature fluids.

Fluid pressure in the outlet 14 may be adjusted by means of the adjusting screw 88 of the pressure regulator 76, which will change the reference pressure.

When it is desired to shut off flow through the seat 18, the solenoid valve 56 is deenergized, permitting the spring 63 to force the ball valve element 62 into closed position on the seat 65, and to open the ball valve 60 with respect to seat 72. Fluid pressure in the conduit 70 is then rapidly vented through the valve seat 72 and vent 74 to atmosphere. This action reduces pressure in the conduit 98 and cylinder 100, permitting combined forces of fluid in the chamber 114 and the spring 108 to force the piston valve 104 and gasket 110 away from the surface 112. Thus, fluid pressure is permitted to escape rapidly from the chamber 114 through the passage 113 and vent 101 to atmosphere. The reduction of fluid pressure in the chamber 114 permits force of the spring 130, fluid pressure in chamber 126, and a fluid pressure differential on the valve 16 and piston 22 to force the valve 16 closed against its seat 18. It will be understood that, due to action of the piston valve 104, reference pressure in the chamber 114 is very quickly reduced. In addition, fluid pressure in the chamber 26 is rapidly increased, to that existing in the inlet 12, when the ball valve element 62 is closed upon the seat 65. Pressure acting on the end 21 of the piston 22 and on the diaphragm 116 acts to close the valve 16 on the seat 18.

The plunger 140 and switch 142 provide for remote indication as to whether or not the valve 16 is in an open or closed position.

It will be obvious to those skilled in the art that, within the spirit and scope of the invention, various modifications of the invention may be made, and that the valve of the invention may be adapted for use in connection with a variety of pressure fluid supplies, and may be used for various purposes when it is desired to control and shut off the flow of high-pressure fluids.

We claim:

1. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; actuating means operatively connected with said main valve, said actuating means having first and second oppositely disposed fluid pressure responsive surfaces; means forming a passage for applying outlet pressure to the first opposed surface of said actuating means to urge said main valve toward closed position; means forming a second passage for conducting fluid from said inlet passage to the second opposed surface of said actuating means to urge said main valve toward open position; means forming a restricted orifice in said second passage; means providing a surface area in motion transmitting relation with said main valve, said surface area being exposed to the fluid pressure in said second passage between said orifice and said actuating means, such pressure tending to move said main valve toward closed position; and control pressure regulating means communicating with said second passage between said orifice and said actuating means.

2. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; resilient means operatively engaged with said main valve and tending to urge the same toward a closed position; actuating means operatively connected with said main valve, said actuating means having first and second oppositely disposed fluid pressure responsive surfaces; means forming a passage for applying outlet pressure to the first opposed surface of said actuating means to urge said main valve toward closed position; means forming a second passage for conducting fluid from said inlet passage to the second opposed surface of said actuating means to urge said main valve toward open position; means forming a restricted orifice in said second passage; means providing a surface area in motion transmitting relation with said main valve, said surface area being exposed to the fluid pressure in said second passage between said orifice and said actuating means, such pressure tending to move said main valve toward closed position; and control pressure regulating means communicating with said second passage between said orifice and said actuating means.

3. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; resilient means operatively engaged with said main valve and tending to urge the same toward a closed position; actuating means operatively connected with said main valve, said actuating means having first and second oppositely disposed fluid pressure responsive surfaces; means forming a passage for applying outlet pressure to the first opposed surface of said actuating means to urge said main valve toward closed position; means forming a second passage for conducting fluid from said inlet passage to the second opposed surface of said actuating means to urge said main valve toward open position; means forming a restricted orifice in said second passage; means providing a surface area in motion transmitting relation with said main valve, said surface area being exposed to the fluid pressure in said second passage between said orifice and said actuating means, such pressure tending to move said main valve toward closed position; double-acting valve means in said second passage between said surface area and said actuating means, said valve means being operative to alternately interrupt and provide for fluid flow from said inlet passage through said second passage, said double-acting valve means serving to expose the second surface of said actuating means to a reduced pressure when fluid flow through said second passage is interrupted; and control pressure regulating means communicating with said second passage between said orifice and said actuating means.

4. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; actuating means operatively connected with said main valve, said actuating means having first and second oppositely disposed fluid pressure responsive surfaces; means forming a passage for applying outlet pressure to the first opposed surface of said actuating means to urge said main valve toward closed position; means forming a second passage for conducting fluid from said inlet passage to the second opposed surface of said actuating means to urge said main valve toward open position; means forming a restricted orifice in said second passage; means providing a surface area in motion transmitting relation with said main valve, said surface area being exposed to the fluid pressure in said second passage between said orifice and said actuating means, such pressure tending to move said main valve toward closed position; double-acting valve means in said second passage between said surface area and said actuating means, said valve means being operative to alternately interrupt and provide for fluid flow from said inlet passage through said second passage, said double-acting valve means serving to expose the second surface of said actuating means to a reduced pressure when fluid flow through said second passage is interrupted; vent valve means in said second passage, said vent valve means being retained in closed position by fluid flow through said second passage and operative to expose the second surface of said actuating means to a reduced pressure when fluid flow through said second passage is interrupted or reversed; and control pressure regulating means communicating with said second passage between said orifice and said actuating means.

5. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; actuating mean operatively connected with said main valve, said actuating means having first and second oppositely disposed fluid pressure responsive surfaces; means forming a passage for applying outlet pressure to the first opposed surface of said actuating means to urge said main valve toward closed position; means forming a second passage for conducting fluid from said inlet passage to the second opposed surface of said actuating means to urge said main valve toward open position; means forming a variable orifice in said second passage, said orifice forming means being responsive to a predetermined reduction in inlet pressure to increase the effective size of such orifice; and bleed-off control pressure regulating means communicating with said second passage between said orifice and said actuating means.

6. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; actuating means operatively connected with said main valve, said actuating means having first and second oppositely disposed fluid pressure responsive surfaces; means forming a passage for applying outlet pressure to the first opposed surface of said actuating means to urge said main valve toward closed position; means forming a second passage for conducting fluid from said inlet passage to the second opposed surface of said actuating means to urge said main valve toward open position; a member supported for movement in said housing, said member forming orifices of different effective sizes in said second passage in different positions of movement, said member moving in response to changes in pressure in said inlet passage to vary the effective size of the orifice formed thereby; and bleed-off control pressure regulating means communicating with said second passage between said orifice and said actuating means.

7. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; actuating means operatively disposed relative to said main valve, said actuating means having first and second oppositely facing fluid pressure responsive surfaces; resilient means normally tending to move said main valve toward one position; means forming a passage for applying outlet pressure to the first fluid pressure responsive surface to urge said main valve in the same direction as said resilient means; means forming a second passage for conducting fluid from said inlet passage to the second fluid pressure responsive surface to urge said main valve in opposition to said resilient means; means forming an orifice in said second passage for substantially restricting fluid flow therethrough to provide bleed flow into said second passage; and bleed-off control pressure regulating means communicating with said second passage between said orifice and said actuating means.

8. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; actuating means operatively disposed relative to said main valve, said actuating means having first and second oppositely facing fluid pressure responsive surfaces; resilient means normally tending to move said main valve toward one position; means forming a passage for applying outlet pressure to the first fluid pressure responsive surface to urge said main valve in the same direction as said resilient means; means forming a second passage for conducting fluid from said inlet passage to the second fluid pressure responsive surface to urge said main valve in opposition to said resilient means; means forming an orifice in said second passage for restricting fluid flow therethrough; means responsive to variations in pressure in said inlet passage to vary the effective size of said orifice; and bleed-off control pressure regulating means communicating with said second passage between said orifice and said actuating means.

9. In a pressure regulating and shutoff valve, the combination of: a housing having fluid pressure inlet and outlet passages; a valve seat in said housing between said inlet and outlet passages; a main valve disposed in said housing for movement relative to said seat to control fluid flow between said inlet and outlet passages; actuating means operatively disposed relative to said main valve, said actuating means having first and second oppositely facing fluid pressure responsive surfaces; resilient means normally tending to move said main valve toward one position; means forming a passage for applying outlet pressure to the first fluid pressure responsive surface to urge said main valve in the same direction as said resilient means; means forming a second passage for conducting fluid from said inlet passage to the second fluid pressure responsive surface to urge said main valve in opposition to said resilient means; valve means communicating with said second passage, said valve means being operative to alternately connect said second passage with said inlet passage and a region of reduced pressure; a vent valve in said second passage, fluid flow to said actuating means serving to retain said vent valve in closed position; means operative upon cessation of fluid flow through said second passage to said actuating means to cause said vent valve to expose said second fluid pressure responsive surface to reduced pressure; and bleed-off control pressure regulating means communicating with said second passage between said inlet passage and said vent valve.

References Cited in the file of this patent

UNITED STATES PATENTS

| | | |
|---|---|---|
| 2,174,797 | Magnuson | Oct. 3, 1939 |
| 2,226,761 | Fox | Dec. 31, 1940 |
| 2,353,161 | Heigis | July 11, 1944 |
| 2,367,662 | Baxter | Jan. 23, 1945 |
| 2,536,663 | Schaer | Jan. 2, 1951 |
| 2,610,859 | Wilcox | Sept. 16, 1952 |
| 2,617,233 | Hoffman | Nov. 11, 1952 |
| 2,624,542 | Ghormley | Jan. 6, 1953 |
| 2,731,033 | Cable | Jan. 17, 1956 |